(No Model.)

J. A. MORRELL.
PROCESS OF EVAPORATING LIQUIDS.

No. 441,319. Patented Nov. 25, 1890.

WITNESSES:

INVENTOR

ATTORNEY

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

PROCESS OF EVAPORATING LIQUIDS.

SPECIFICATION forming part of Letters Patent No. 441,319, dated November 25, 1890.

Application filed December 13, 1888. Renewed April 1, 1890. Serial No. 346,173. (No specimens.)

*To all whom it may concern:*

Be it known that I, JAMES A. MORRELL, a citizen of the United States, residing at Lansdale, in the county of Montgomery and State of Pennsylvania, have invented a certain new and useful Process of Evaporating Fluids and Concentrating Solutions; and I do hereby declare the following to be a sufficiently full, clear, and exact description thereof to enable others skilled in the art to make and use the said invention.

This invention relates to the evaporation of solutions for the purposes of concentrating them and of crystallizing the residuum, and is especially applicable to saccharine solutions in procuring sugar from vegetable juices and in solutions employed in refining.

The invention consists in the method or process of heating the solution in a vessel or tube above the normal temperature and in charging the solution with air or gases under pressure, and then liberating the solution thus superheated and charged with air or gas in minute jets or sprays in a heated chamber, in which it is exposed to high temperature from radiation of heated bodies, in which chamber the concentrated solution or solid matter is precipitated and at the bottom of which it is collected.

The apparatus in which this process may be performed is hereinafter described, and shown in the accompanying drawings, in which—

Figure 1:
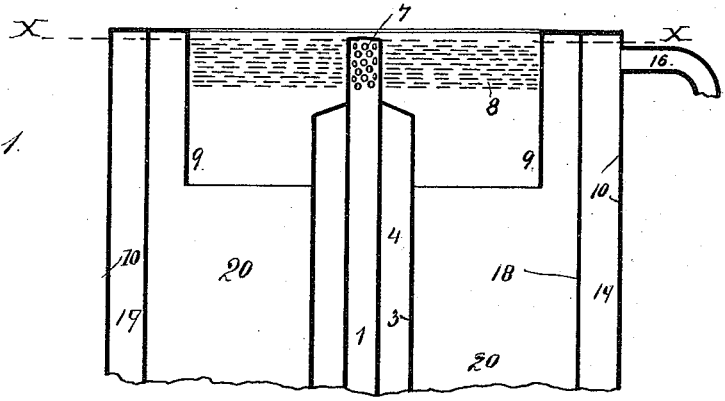
Figure 2:
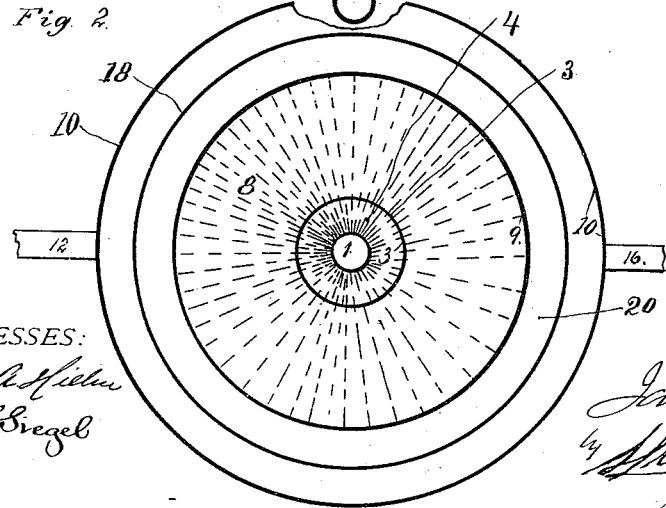

Figure 1 shows a vertical section. Fig. 2 is a sectional view taken on the line $xx$, Fig. 1.

The same reference-marks indicate like parts in both figures.

This apparatus is not claimed herein as a part of this invention, but is the subject of a distinct application for Letters Patent, Serial No. 293,535, of even date herewith. The same method or process can be conducted or practiced with apparatus of other construction.

Referring to the drawings, 1 is a vertical pipe receiving a supply of fluid at the lower end 2 under a sufficient pressure to overcome the elastic force of vapors and gas or air at the temperature to which the fluid is heated. At the lower end of the pipe 1 is inserted a jet-nozzle 14, through which air or gas supplied by a pipe 13 is forced, this gas being preferably highly heated.

3 is a closed jacket surrounding the pipe 1, with a chamber 4 included, which is kept constantly supplied by pipe 5 with superheated steam or other heated fluid at a temperature above the boiling-point of the solution in the tube 1. A similar pipe 6 is provided for the withdrawal of water of condensation.

The upper end of the tube 1 projects above the jacket 3, is closed at the top, and has in its sides minute perforations 7, from which jets or sprays 8 of the solution are forcibly ejected horizontally against a cylindrical screen 9. Surrounding the wall of the evaporating-chamber is a cylindrical jacket 10, which extends downwardly nearly the entire length of the apparatus and is closed at its top and at the base 11, and within the wall 18 of the evaporating-chamber forms an airtight chamber 19. The evaporating-chamber 20 is open at its top and is provided with a trap-pipe 12, through which fluid may be drawn off without admitting any air to circulate in the said chamber. The outer wall 10 of the chamber 19 is clothed to avoid waste of heat by radiation, and the said chamber is kept supplied with fluid at a temperature above the boiling-point of the solution to be concentrated.

A pipe 16 is provided to supply steam to the chamber 19, and a similar pipe 17 is employed for the withdrawal of the water of condensation from the chamber 19.

The method of using this apparatus is as follows: Superheated steam or other equivalent heating-fluid is introduced into and circulated under pressure through the chambers 19 and 4 until the temperature of the chamber 20 is above the boiling-point of the solution to be concentrated. The solution is then forced in through the lower end 2 of the pipe 1 and is charged with air or gas from the pipe 1 and nozzle 14, and, rising in said pipe 1, acquires the temperature of the fluid in chamber 4, and, issuing in minute sprays 8 from the perforations 7, suddenly flashes into vapor, liberating the air or gas and precipitating the dissolved material with but a small proportion of liquid solution in the space within the chamber 20, where it becomes highly heated, and, reaching the bottom deprived of most of the moisture, is drawn off by the pipe 12. I do not limit myself to the proportion or form of the apparatus, but have found a diameter of ten inches for the chamber 20 with a height of twenty feet to be usefully operative.

Having described this invention, what I claim is—

The herein-described process of concentrating solutions, consisting in charging the solution with air or gas, conveying it to a receptacle where it is heated under pressure to a temperature beyond its normal temperature of ebullition, spraying it against a screen in an atmosphere of greater temperature than the boiling-point, precipitating it from the said screen in divided particles in a chamber wherein it is heated beyond the temperature of ebullition, and finally collecting the concentrated solution from such chamber, substantially as described.

JAMES A. MORRELL.

Witnesses:
LUTHER L. CHENEY,
H. B. S. MORRELL.